United States Patent
Fujiwara et al.

[11] Patent Number: 5,188,281
[45] Date of Patent: Feb. 23, 1993

[54] BRAZING PROCEDURE IN INERT ATMOSPHERE

[75] Inventors: Chikara Fujiwara; Takashi Onda; Akira Fukushima, all of Nagoya, Japan

[73] Assignee: Mitsubishi Jukogyo Kabushiki Kaisha, Tokyo, Japan

[21] Appl. No.: 701,827

[22] Filed: May 17, 1991

[30] Foreign Application Priority Data

May 30, 1990 [JP] Japan .................. 2-138389

[51] Int. Cl.$^5$ .............................................. B23K 1/00
[52] U.S. Cl. .................................. 228/189; 228/186; 228/219; 228/237
[58] Field of Search ............... 228/44.3, 175, 186, 228/219, 157, 237, 189; 29/889.6, 889.721, 889.722, 889.72

[56] References Cited

U.S. PATENT DOCUMENTS

| | | | |
|---|---|---|---|
| 3,044,152 | 7/1962 | Stalker | 228/175 X |
| 3,091,846 | 6/1963 | Henry | 228/219 X |
| 3,623,204 | 11/1971 | Wagle | 228/237 X |
| 3,653,110 | 4/1972 | King, Jr. et al. | 29/889.72 |
| 3,737,978 | 6/1973 | Rathbun | 228/219 X |
| 4,043,498 | 8/1977 | Conn, Jr. | 228/157 X |
| 4,087,037 | 5/1978 | Schier et al. | 228/44.3 X |
| 4,089,456 | 5/1978 | Toppen et al. | 29/889.72 X |
| 5,072,871 | 12/1991 | Moracz et al. | 29/889.72 X |

OTHER PUBLICATIONS

The Rolls Royce Magazine, No. 41, Jun. 1989, pp. 24–28.

Primary Examiner—Samuel M. Heinrich
Attorney, Agent, or Firm—Jacobson, Price, Holman & Stern

[57] ABSTRACT

A brazing procedure including the steps of retaining a component (7) having a brazing section (2) therein by means of a die assembly (3, 4) which is compressed by a hot press (8), admitting (6) an inert gas into the component to produce an inert atmosphere inside the component having a pressure which is higher than the outer pressure, and then heating (5) the component thereby brazing the section. A brazing clearance is maintained at a proper amount prior to brazing, and the outer configuration of the component is maintained with enhanced precision. The brazing operation is also advantageous due to its reduced operating cost.

17 Claims, 1 Drawing Sheet

BRAZING PROCEDURE IN INERT ATMOSPHERE

BACKGROUND OF THE INVENTION

1. Field of the Invention

The present invention relates to a brazing procedure in an inert atmosphere for application to hollow fan blades such as those used in aviation and general industrial gas turbines.

2. Description of the Related Art

Hollow fan blades for gas turbines have traditionally been manufactured in accordance with a vacuum brazing method using a vacuum furnace.

Prior art vacuum brazing methods have suffered from problems encountered in brazing components of large and complicated configurations as follow:

(1) When the components to be brazed have three-dimensional curved brazing surfaces, it is difficult to hold the brazed surface in position, and therefore it is difficult to control the brazing clearance and therefore a defective brazing performance results.

(2) A change in the configuration is likely to occur due to the self-weight of the component to be brazed.

(3) A long brazing cycle is required.

(4) Inconsistent heating results when brazing large-sized components.

(5) The brazing equipment is expensive.

BRIEF SUMMARY OF THE INVENTION

Taking the above problems into consideration, it is therefore an object of the present invention to provide a brazing procedure, wherein a component to be brazed is held in position by means of a die which is in turn compressed by a hot press having a brazing section therein, an inert gas is admitted into the component to realize an inert atmosphere therein having a pressure higher than the external pressure, and then the component is heated for brazing.

In the above-described procedure, a seal may be realized around the component having the brazing section therein. This component is compressed and held in place by means of a die which is compressed by a hot press, allowing an operator to precisely control the brazing clearance for a brazing section having a complicated configuration.

Subsequently, an inner gas is admitted into the interior of the abovedescribed component, and the pressure in the interior of the component is raised higher than the external pressure. Thus, the outer surface of the component may retain the configuration of the surface of the die utilizing its differential pressure therebetween to prevent its deformation under its self-weight. With the component heated by means of the hot press, an inert atmosphere prevails in the interior of the component and a satisfactory brazing operation is ensured.

Furthermore, since the clearance may be controlled at a precise level, a satisfactory brazing may be realized. Moreover, since the interior of the component is maintained at a pressure which is higher than an external pressure, utilizing an inert gas, and the outer surface of the component is urged against the surface of the die, the configuration of the outer surface of the component can be maintained precisely. The use of the hot press results in a low-cost brazing operation.

DETAILED DESCRIPTION OF THE PREFERRED EMBODIMENT

One embodiment of the present invention will be described hereinbelow, with reference to FIG. 1 and FIG. 2.

Figure 1:
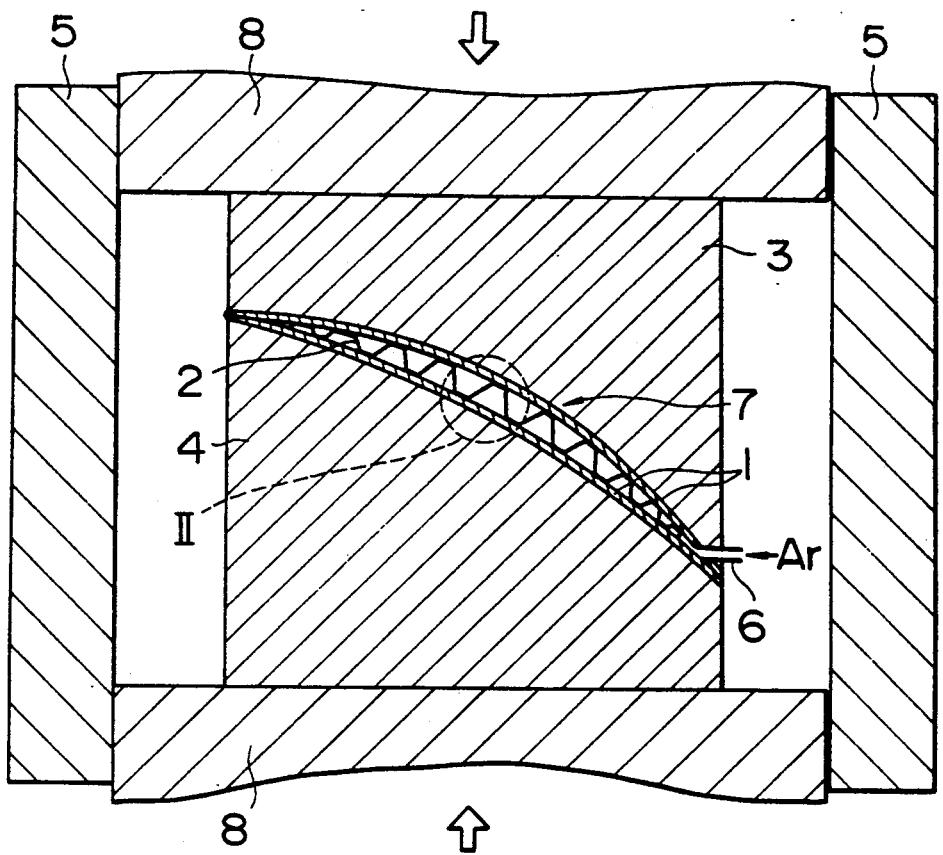
FIG. 1 is a sectional view showing the first embodiment of the present invention.
Figure 2:
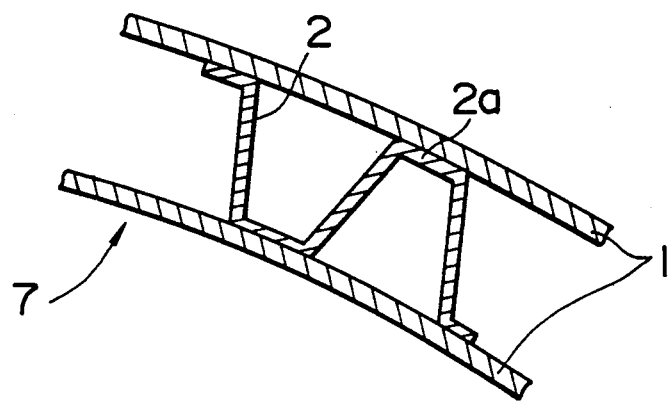
FIG. 2 is an enlarged sectional view taken on the section II of FIG. 1.

Referring first to FIG. 1 and FIG. 2, an Ar gas admission tube 6 is welded to a skin 1 made from Ti-6 Al-4V. A brazing material (Ti-20Cu-20Ni-20Zr) is then coated over the dimple head 2a of the dimple core made from Ti-6Al-4V by low pressure plasma spraying. Then, two sheets of the above skins 1 and the dimple core 2 are laminated together in position, and then welded therearound to form a sealing using tungsten inert gas (TIG) welding, and thus a component 7 is formed. The component 7 comprising the skin 1 and the dimple core 2 which have been laminated and sealed is set up beforehand in position between dies 3 and 4 which have been preheated to a temperature of 650° C. The internal air is exhausted under vacuum through a tube 6 provided on the skin 1. The dies 3 and 4, and the component 7 are heated by means of the side-heater 5, and the skin 1 and the dimple core 2 are subject to a hot-sizing operation, while further continuing the vacuum exhaust. At this moment, the brazing clearance is controlled so as to be less than the spraying film thickness (about 50 ↑ m).

When the above dies 3 and 4, and the component 7 are heated to a temperature of 750° C., the vacuum exhausting operation is discontinued to introduce the Ar gas into the interior of the component 7 and retain its pressure at a level which is higher than the external pressure of the component, for example, 5 Torr above the atmospheric pressure or around 765 Torr. The above heating operation is continued until the brazing temperature of 900° C. is reached, and then this brazing temperature is maintained for 10 minutes. Then, the component is cooled, and when the temperature drops to 650° C., the component is withdrawn from the press 8 thus completing the brazing operation.

In the procedure of the present invention, since the component 7 around which a seal welding is created is compressed together with the dies 3 and 4 which pinch the component therebetween by means of the press 8, it is possible to precisely control the brazing clearance of a brazing section with a complicated configuration (three-dimensional curved surface). After the vacuum exhausting operation of component 7 is completed while the component is heated, an inert gas is permitted to flow into the interior of the component. Thus, the brazing section may be maintained in an inert atmosphere, and thus the brazing operation can also be done in an atmospheric furnace (hot press). Furthermore, since the inert gas pressure at the brazing section is preset at a level which is slightly higher than the atmospheric pressure, the outer surface of the brazing component 7 may retain its configuration conforming with those of the dies 3 and 4 due to a differential pressure created between the inside and the outside, thereby preventing the deformation of the brazing component 7 under its self-weight. Moreover, since the above dies 3 and 4 are heated beforehand to an approximate temperature of 600° C., the time needed to complete one brazing cycle can be substantially shortened compared to that in the vacuum brazing operation. The hot press which may be used to carry out the above brazing operation represents an improvement over the prior vacuum furnace due to its consistent and uniform heating effect for large-sized components and due to its reduced cost in the brazing operation.

In the procedure for the inert atmosphere brazing operation in accordance with the present invention, the component having a brazing section therein is retained in position by means of a die which is in turn compressed by the hot press. The component is heated, while its internal portion is pressurized by an inert gas which has been admitted into the component to carry out the brazing operation. Since the brazing clearance at the brazing section may be controlled with precision, a satisfactory brazing operation results. Moreover, since the inert gas is utilized to keep the pressure in the interior of the component at a higher level than the external pressure, and the component is forced at the outer surface against the surface of the die, therefore the outer configuration of the component may be maintained with enhanced precision. Furthermore, the use of the hot press may reduce the cost of the brazing operation.

We claim:

1. A brazing process for brazing a hollow workpiece in the inside thereof comprising:
    providing a die having at least two die parts relatively moveable toward and away from each other, said die parts having die surfaces conforming to the external shape of the finished workpiece and forming a die cavity;
    providing brazing material on at least one interior section of a hollow workpiece to be brazed;
    positioning said hollow workpiece in said die cavity;
    pressing said die parts toward each other in a press so that said die surfaces conform to the desired external configuration of the finished workpiece;
    injecting an inert gas into the interior of said hollow workpiece at a pressure sufficient to urge said workpiece against said die surfaces;
    heating said workpiece to effect said brazing; and
    maintaining said pressure of said inert gas sufficient to urge said workpiece against said die surfaces and prevent inward deformation of said workpiece during said brazing.

2. The process as claimed in claim 1 and further comprising:
    forming said workpiece by laminating a skin over a dimple core having dimple heads so that said dimple core is in the interior of said hollow workpiece with said dimple heads closely adjacent said skin for brazing thereto.

3. The process as claimed in claim 2 and further comprising:
    coating said brazing material onto said dimple heads prior to said laminating step so that said brazing is effected between said dimple heads and said skin.

4. The process as claimed in claim 2 wherein:
    said forming of said workpiece further comprises sealing said workpiece by welding said skin prior to positioning said workpiece in said die cavity.

5. The process as claimed in claim 3 wherein:
    said forming of said workpiece further comprises sealing said workpiece by welding said skin prior to positioning said workpiece in said die cavity.

6. The brazing process as claimed in claim 1 wherein said workpiece comprises Ti-6 Al-4V skin.

7. The brazing process as claimed in claim 2 wherein said inert gas pressure is about 765 Torr.

8. The brazing process as claimed in claim 3 wherein said inert gas pressure is about 765 Torr.

9. The brazing process as claimed in claim 2 wherein said heating is to a temperature of about 900° C.

10. The brazing process as claimed in claim 3 wherein said heating is to a temperature of about 900° C.

11. The brazing process as claimed in claim 2 wherein said skin is a Ti-6 Al-4V skin.

12. The brazing process as claimed in claim 2 wherein the dimple core is a Ti-6 Al-4V.

13. The brazing process as claimed in claim 3 wherein said brazing material is Ti-20Cu-20Ni-20Zr.

14. The brazing process as claimed in claim 4 wherein said welding is tungsten inert gas welding.

15. The brazing process as claimed in claim 1 wherein said inert gas pressure is about 765 Torr.

16. The brazing process as claimed in claim 1 wherein said heating is to a temperature of about 900° C.

17. The brazing process as claimed in claim 1 wherein said heating comprises heating in a hot press.

* * * * *